(12) United States Patent
Cheng et al.

(10) Patent No.: US 11,004,235 B2
(45) Date of Patent: May 11, 2021

(54) METHOD AND APPARATUS FOR DETERMINING POSITION AND ORIENTATION OF BUCKET OF EXCAVATOR

(71) Applicant: BEIJING BAIDU NETCOM SCIENCE AND TECHNOLOGY CO., LTD., Beijing (CN)

(72) Inventors: Xinjing Cheng, Beijing (CN); Ruigang Yang, Beijing (CN); Feixiang Lu, Beijing (CN); Yajue Yang, Beijing (CN); Hao Xu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 31 days.

(21) Appl. No.: 16/675,825

(22) Filed: Nov. 6, 2019

(65) Prior Publication Data

US 2020/0279397 A1 Sep. 3, 2020

(30) Foreign Application Priority Data

Feb. 28, 2019 (CN) .......................... 201910148743.6

(51) Int. Cl.
*G06T 7/73* (2017.01)
*G06K 9/00* (2006.01)
(Continued)

(52) U.S. Cl.
CPC ............ *G06T 7/74* (2017.01); *G06K 9/00791* (2013.01); *G06K 9/2063* (2013.01); *G06T 7/60* (2013.01);
(Continued)

(58) Field of Classification Search
CPC .... G06T 7/70; G06T 7/73; G06T 7/74; G06T 2207/30204; G06T 2207/30252;
(Continued)

(56) References Cited

U.S. PATENT DOCUMENTS

| 6,724,930 B1* | 4/2004 | Kosaka et al. ....... G01B 11/002 382/154 |
| 2017/0002547 A1* | 1/2017 | Omote ................... G01B 11/24 |

(Continued)

FOREIGN PATENT DOCUMENTS

| CN | 101839692 A | 9/2010 |
| CN | 104476548 A | 4/2015 |

(Continued)

*Primary Examiner* — Andrew W Johns
(74) *Attorney, Agent, or Firm* — Seed IP Law Group LLP

(57) ABSTRACT

Embodiments of the present disclosure provide a method and apparatus for determining position and orientation of a bucket of an excavator, an electronic device and a computer readable medium. The method may include: acquiring an image of a bucket of an excavator collected by a camera provided on an excavator body, the image of the bucket including a preset marker provided on the bucket; determining position and orientation information of the camera relative to the bucket on the basis of the image of the bucket and pre-acquired three-dimensional feature information of the preset marker; and converting the position and orientation information of the camera relative to the bucket into position and orientation information of the bucket relative to the excavator body.

15 Claims, 5 Drawing Sheets

(51) Int. Cl.
*G06T 7/60* (2017.01)
*G06K 9/20* (2006.01)

(52) U.S. Cl.
CPC ............... *G06K 2209/21* (2013.01); *G06T 2207/30204* (2013.01); *G06T 2207/30252* (2013.01)

(58) Field of Classification Search
CPC ............ G06K 9/00791; G06K 9/2063; G06K 2209/21; G01B 11/002; G01B 11/005; G01B 11/14; Y10S 901/02; Y10S 901/14; Y10S 901/15; Y10S 901/16; Y10S 901/47
See application file for complete search history.

(56) References Cited

U.S. PATENT DOCUMENTS

| | | | |
|---|---|---|---|
| 2018/0071032 A1* | 3/2018 | de Almeida Barreto | ............... A61B 34/10 |
| 2018/0165502 A1 | 6/2018 | Mianzo et al. | ...... G06K 9/0063 |

FOREIGN PATENT DOCUMENTS

| | | | |
|---|---|---|---|
| CN | 106104197 A | 11/2016 |
| CN | 106780610 A | 5/2017 |
| CN | 106817905 A | 6/2017 |
| CN | 106836364 A | 6/2017 |
| CN | 107481287 A | 12/2017 |
| CN | 108951750 A | 12/2018 |
| JP | 2010-160056 A | 7/2010 |
| JP | 2015-224875 A | 12/2015 |
| JP | 2017-193958 A | 10/2017 |
| WO | WO2018183114 A1 | 10/2018 |

\* cited by examiner

METHOD AND APPARATUS FOR DETERMINING POSITION AND ORIENTATION OF BUCKET OF EXCAVATOR

CROSS-REFERENCE TO RELATED APPLICATIONS

This application claims priority to Chinese Patent Application No. 201910148743.6, filed on Feb. 28, 2019, titled "Method and apparatus for determining position and orientation of bucket of excavator," which is hereby incorporated by reference in its entirety.

TECHNICAL FIELD

Embodiment of the present disclosure relate to the field of computer technology, specifically to the field of excavator, and more specifically to a method and apparatus for determining position and orientation of a bucket of an excavator.

BACKGROUND

An unmanned excavator is an intelligent excavating device that senses an excavation object by means of various sensors, plans an operational behavior, and executes an operation instruction. When executing a task of excavating a material pile, the unmanned excavator needs to control a bucket to move to a target area of a mound for excavation. Therefore, it is necessary to accurately and quickly determine position and orientation of the bucket relative to an excavator body. The current solution is to install angle sensors on a big arm, a small arm and the bucket of the excavator, and determine the position and orientation of the bucket according to readings in such sensors.

SUMMARY

Embodiments of the present disclosure provide a method and apparatus for determining position and orientation of a bucket of an excavator, an electronic device and a computer readable medium.

In a first aspect, an embodiment of the present disclosure provides a method for determining position and orientation of a bucket of an excavator, including: acquiring an image of the bucket of the excavator captured by a camera provided on an excavator body, the image of the bucket including a preset marker provided on the bucket; determining position and orientation information of the camera relative to the bucket on the basis of the image of the bucket and pre-acquired three-dimensional feature information of the preset marker; and converting the position and orientation information of the camera relative to the bucket into position and orientation information of the bucket relative to the excavator body.

In some embodiments, the three-dimensional feature information of the preset marker includes spatial position information of a feature point of the preset marker; and the determining position and orientation information of the camera relative to the bucket on the basis of the image of the bucket and pre-acquired three-dimensional feature information of the preset marker includes: determining a three-dimensional coordinate of the feature point of the preset marker according to the spatial position information of the feature point of the preset marker; detecting the feature point of the preset marker in the image of the bucket, and determining a pixel coordinate of the feature point of the preset marker in the image of the bucket; and estimating the position and orientation information of the camera relative to the bucket on the basis of the three-dimensional coordinate of the feature point of the preset marker, the pixel coordinate of the feature point of the preset marker in the image of the bucket, and a pre-acquired internal parameter of the camera.

In some embodiments, the determining position and orientation information of the camera relative to the bucket on the basis of the image of the bucket and pre-acquired three-dimensional feature information of the preset marker further includes: matching the image of the bucket on the basis of marker information included in a preset marker information library to identify the preset marker.

In some embodiments, the matching the image of the bucket on the basis of marker information included in a preset marker information library to identify the preset marker includes: acquiring angle sensing data sensed by angle sensors that are provided on an excavating arm of the excavator and the bucket; determining a target position range of the preset marker in the image of the bucket on the basis of the angle sensing data; and detecting marker information within the target position range, and matching in the preset marker information library so as to identify the preset marker.

In some embodiments, the preset marker includes a preset QR code label, and the feature point of the preset marker includes an angular point of the preset QR code label.

In a second aspect, an embodiment of the present disclosure provides an apparatus for determining position and orientation of a bucket of an excavator, including: an acquisition unit, configured to acquire an image of the bucket of the excavator captured by a camera provided on an excavator body, the image of the bucket including a preset marker provided on the bucket; a determination unit, configured to determine position and orientation information of the camera relative to the bucket on the basis of the image of the bucket and pre-acquired three-dimensional feature information of the preset marker; and a conversion unit, configured to convert the position and orientation information of the camera relative to the bucket into position and orientation information of the bucket relative to the excavator body.

In some embodiments, the three-dimensional feature information of the preset marker includes spatial position information of a feature point of the preset marker; and the determination unit is further configured to determine position and orientation information of the camera relative to the bucket on the basis of the image of the bucket and pre-acquired three-dimensional feature information of the preset marker by: determining a three-dimensional coordinate of the feature point of the preset marker according to the spatial position information of the feature point of the preset marker; detecting the feature point of the preset marker in the image of the bucket, and determining a pixel coordinate of the feature point of the preset marker in the image of the bucket; and estimating position and orientation information of the camera relative to the bucket on the basis of the three-dimensional coordinate of the feature point of the preset marker, the pixel coordinate of the feature point of the preset marker in the image of the bucket, and a pre-acquired internal parameter of the camera.

In some embodiments, the determination unit is further configured to match the image of the bucket on the basis of marker information included in a preset marker information library to identify the preset marker.

In some embodiments, the determination unit is further configured to identify the preset marker by: acquiring angle sensing data sensed by angle sensors provided on an excavating arm of the excavator and the bucket; determining a target position range of the preset marker in the image of the bucket on the basis of the angle sensing data; and detecting marker information within the target position range, and matching in the preset marker information library to identify the preset marker.

In some embodiments, the preset marker includes a preset QR code label, and the feature point of the preset marker includes an angular point of the preset QR code label.

In a third aspect, an embodiment of the present disclosure provides an electronic device, including: one or more processors; and a storage apparatus, storing one or more programs, wherein the one or more programs, when executed by the one or more processors, cause the one or more processors to implement the method for determining position and orientation of a bucket of an excavator provided in the first aspect.

In a fourth aspect, an embodiment of the present disclosure provides a computer readable medium, storing a computer program, wherein the program, when executed by a processor, implements the method for determining position and orientation of a bucket of an excavator provided in the first aspect.

The method and apparatus for determining position and orientation of a bucket of an excavator according to the embodiments of the present disclosure acquire an image of the bucket of the excavator captured by a camera provided on an excavator body, the image of the bucket including a preset marker provided on the bucket; determine position and orientation information of the camera relative to the bucket on the basis of the image of the bucket and pre-acquired three-dimensional feature information of the preset marker; and convert the position and orientation information of the camera relative to the bucket into position and orientation information of the bucket relative to the excavator body, thereby achieving precise calculation of the position and orientation of the bucket on the basis of the image of the preset marker provided on the bucket.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
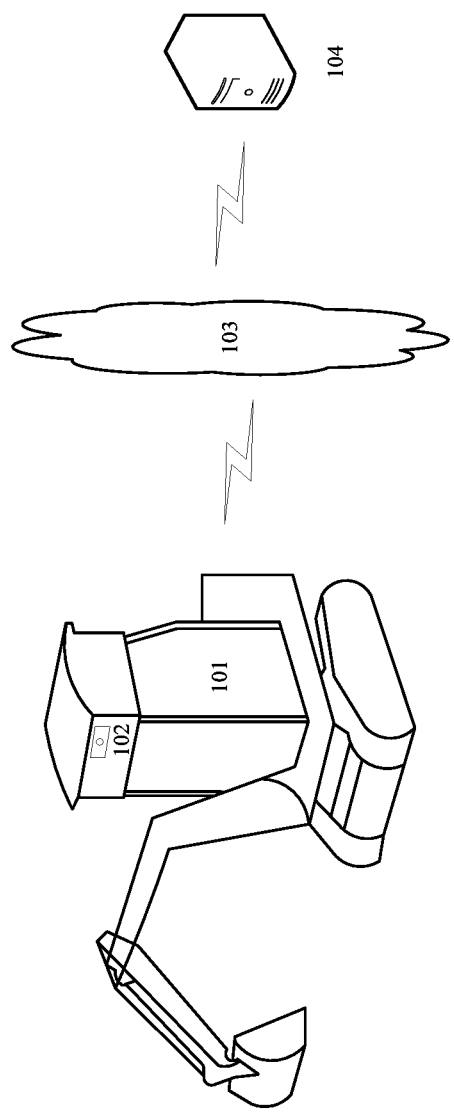
FIG. 1 is an architectural diagram of an exemplary system in which embodiments of the present disclosure may be applied.

FIG. 1 shows an exemplary system architecture in which a method for determining position and orientation of a bucket of an excavator or an apparatus for determining position and orientation of a bucket of an excavator according to embodiments of the present disclosure may be implemented.

As shown in FIG. 1, the system architecture 100 may include an excavator 101, a camera 102 arranged on the excavator, a network 103 and a server 104. The network 103 serves as a medium providing a communication link between the excavator 101, the camera 102 and the server 104. The network 103 may include various types of connections, such as wired or wireless communication links, or optical fibers.

The excavator 101 may be an unmanned autonomous excavator, and various types of sensors such as an angle sensor, a mechanical sensor and an image sensor may be provided on the unmanned autonomous excavator. The various types of sensors provided on the excavator 101 may sense environmental information including excavation objects and road environments. In some scenarios, the unmanned autonomous excavator 101 may also be provided with a data processing unit such as a CPU or a GPU, and provided with a storage unit. The data processing unit may acquire and process data sensed by a sensor, and the storage unit may store the data sensed by the sensor and store data that the data processing unit needs to invoke to perform a data processing task.

The camera 102 may be an image sensor mounted on the unmanned autonomous excavator 101, and may capture an image of a bucket of the unmanned autonomous excavator. In the application scenario of the present embodiment, the camera 102 may be provided on a body of the unmanned autonomous excavator, and the camera 102 faces the front of the unmanned autonomous excavator 101 to ensure that the bucket of the unmanned autonomous excavator 101 is within an imaging range of the camera 102.

The server 104 maybe a server that provides various services, for example, a back-end server of the unmanned autonomous excavator. The back-end server of the unmanned autonomous excavator may analyze the image of the bucket that is acquired from the camera 102, and control the excavator 101 to excavate on the basis of a processing result (for example, position and orientation of the bucket).

It should be noted that the server 104 may be hardware or software. When the server 104 is hardware, the server may be implemented as a distributed server cluster composed of a plurality of servers, or may be implemented as a single server. When the server 104 is software, the server may be implemented as a plurality of software programs or software modules (such as software programs or software modules for providing distributed services), or may be implemented as a single software program or software module, which is not specifically limited in the present disclosure.

It should be noted that the method for determining position and orientation of a bucket of an excavator according to embodiments of the present disclosure may be executed by the data processing unit provided in the excavator 101 or the server 104, and an apparatus for determining position and orientation of a bucket of an excavator may be provided in the data processing unit of the excavator 101 or the server 104.

It should be understood that the numbers of the excavators, cameras, networks and servers are merely illustrative. Any number of excavators, cameras, networks and servers may be provided on the basis of actual requirements.

Figure 2:
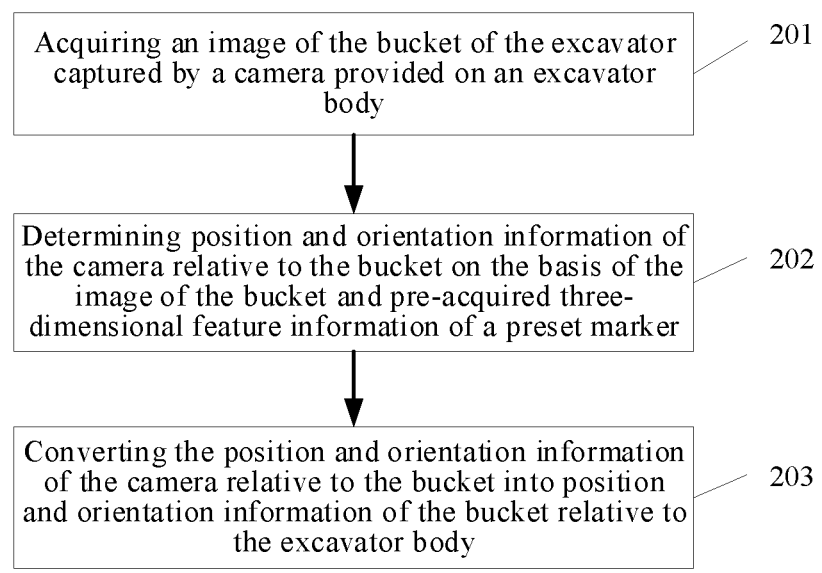
FIG. 2 is a flowchart of a method for determining position and orientation of a bucket of an excavator according to an embodiment of the present disclosure.

Further, referring to FIG. 2, a flow 200 of a method for determining position and orientation of a bucket of an excavator according to an embodiment of the present disclosure is shown. The method for determining position and orientation of a bucket of an excavator includes the following steps.

Step 201: acquiring an image of the bucket of the excavator captured by a camera provided on an excavator body.

The image of the bucket includes a preset marker provided on the bucket.

In the present embodiment, an executing body of the method for determining position and orientation of a bucket of an excavator may be connected to a camera provided on excavator body to acquire an image of the bucket captured by the camera.

The excavator may be an unmanned autonomous excavator, the camera is provided on the excavator body, and a relative position between the camera and the excavator body is fixed. An excavating arm of the excavator may rotate and stretch out and draw back relative to the excavator body so as to drive the bucket to move. The bucket may also be rotated relative to the excavating arm of the excavator. During excavation, it is necessary to detect a current position and orientation of the bucket relative to the excavator body, thereby adjusting the position and orientation of the bucket as needed and excavating a material.

The camera may be provided on a side, facing the bucket, of the excavator body. A preset marker may be placed on the bucket. The preset marker may be an object that has a detectable feature and is used for identifying the position of the bucket, such as an object containing a marker picture composed of random marker points. As an example, the preset marker maybe a component having a specific shape and fixedly connected to the bucket, or may be a picture that marks an object and is pasted to the bucket.

Figure 3:
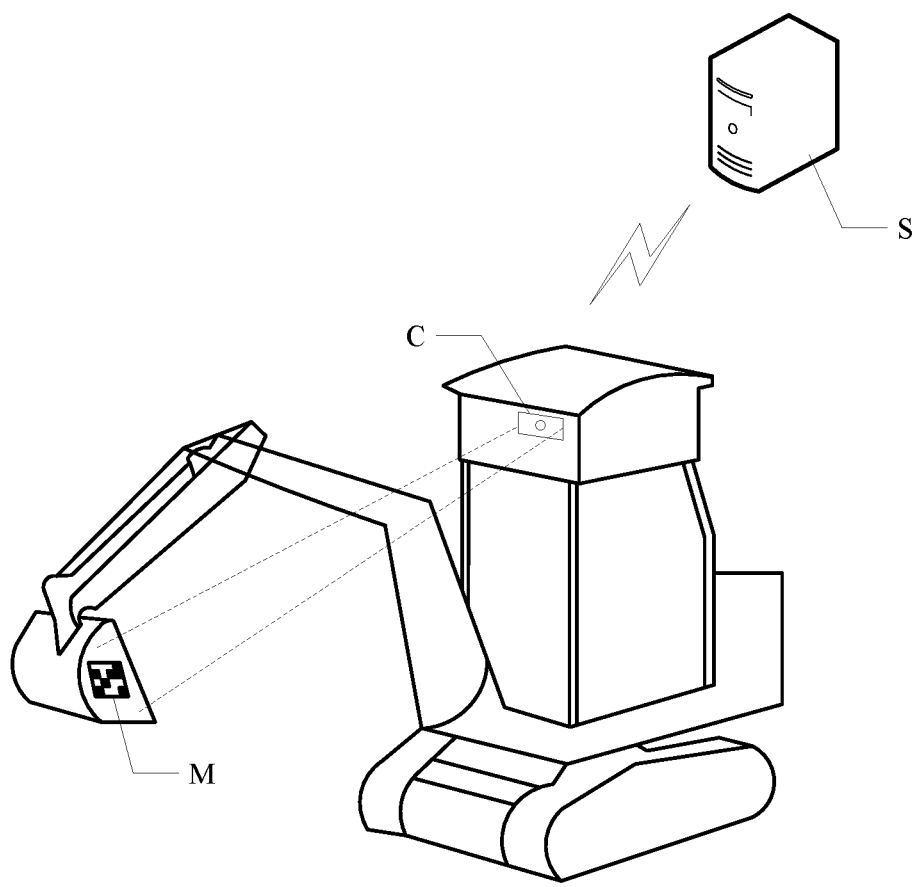
FIG. 3 is a schematic diagram of an application scenario of the embodiment shown in FIG. 2.

Optionally, the preset marker may be a preset QR code label pasted on the bucket in the application scenario shown in FIG. 3. The preset QR code label may be a QR code pattern having a known fixed side length and consisting of pixel blocks that have different colors and are adjacent to each other. In an optional implementation of the present embodiment, a QR code label may be selected from a preset QR code label library and pasted on the bucket as a preset marker.

Step 202: determining position and orientation information of the camera relative to the bucket on the basis of the image of the bucket and pre-acquired three-dimensional feature information of the preset marker.

In the present embodiment, the executing body may first acquire three-dimensional feature information of the preset marker from a preset marker information library. Here, the three-dimensional feature information of the preset marker maybe information that characterizes a shape, a size, a relative position relationship between marker points in the preset marker, or the like. The preset marker information library may include identifiers of a plurality of preset markers, a two-dimensional image and three-dimensional feature information.

Corresponding three-dimensional feature information may be found according to the identifier of the preset marker provided on the bucket. For example, a preset marker picture may be pasted on the bucket. At this time, three-dimensional feature information of a marker corresponding to the picture may be found in the preset marker information library according to the number of the pasted preset marker picture.

Next, a bucket coordinate system may be established to determine a mathematical representation of the preset marker in the bucket coordinate system according to the three-dimensional feature information of the preset marker on the bucket. For example, if the preset marker is a grid pattern, a mathematical representation of the grid pattern in the bucket coordinate system may be a center point coordinate, a diagonal direction and a side length, or may be coordinates of two vertices on a diagonal line of a grid. For another example, if the preset marker is an irregularly shaped stereoscopic object, a mathematical representation of the irregularly shaped stereoscopic object in the bucket coordinate system may be coordinates of a plurality of points on a surface of the stereoscopic object.

The mathematical representation of the preset marker in the image may then be determined from the image of the bucket. The mathematical representation of the preset marker in the image may be an image coordinate of each vertex of the preset marker or a projection point of a point on the surface of the preset marker in an image plane.

Thereafter, position and orientation of the camera relative to the bucket coordinate system may be estimated on the basis of the mathematical representation of the preset marker in the bucket coordinate system and the mathematical representation of the preset marker in the image. Specifically, a conversion relationship between the bucket coordinate system and an image coordinate system may be determined according to three-dimensional coordinates of feature points such as a center point, a vertex and a point on the surface of the preset marker in the bucket coordinate system, as well as two-dimensional coordinates thereof in the image coordinate system. A conversion relationship between the image coordinate system and a camera coordinate system is determined according to a calibrated parameter of the camera, and a conversion relationship between the camera coordinate system and the bucket coordinate system is determined. The conversion relationship may be a transformation matrix including a relative translation distance and a relative rotating angle. In this way, a translation and a rotating angle of the camera coordinate system relative to the bucket coordinate system is determined, that is, position and orientation data of the camera relative to the bucket is determined.

Step 203: converting the position and orientation information of the camera relative to the bucket into position and orientation information of the bucket relative to the excavator body.

The translation and the rotating angle of the camera relative to the bucket may be converted to a translation and a rotating angle of the bucket relative to the camera as the position and orientation information of the bucket relative to the excavator body. At the time of conversion, a translation parameter and a rotating angle parameter of the bucket relative to the camera may be directly obtained by taking opposite numbers of a translation parameter and a rotation parameter of the camera relative to the bucket.

The method for determining position and orientation of a bucket of an excavator according to the embodiments of the present disclosure acquires an image of the bucket of the excavator captured by a camera provided on an excavator body, the image of the bucket including a preset marker provided on the bucket; determines position and orientation information of the camera relative to the bucket on the basis of the image of the bucket and pre-acquired three-dimensional feature information of the preset marker; and converts the position and orientation information of the camera relative to the bucket into position and orientation information of the bucket relative to the excavator body, thereby achieving precise calculation of the position and orientation of the bucket on the basis of the image of the preset marker provided on the bucket. Compared with a currently used method for determining position and orientation of a bucket by reading data in angle sensors provided at different positions, the method according to the present disclosure may avoid a large error in an estimation result of position and orientation of a bucket at an end due to a slight error of a sensor, and may effectively improve the accuracy of estimating the bucket position and orientation.

Referring to FIG. 3, a schematic diagram of an application scenario of the embodiment shown in FIG. 2 is shown. As shown in FIG. 3, a camera C provided on an excavator body may capture an image of a bucket, and a marker M is pasted to the bucket. Here, a QR code label, for example, is used as a preset marker. During excavation, position and orientation of the bucket are adjusted on the basis of a control command for excavation action, and features such as a size and a shape of the marker M in the image captured by the camera C change accordingly. Position and orientation parameters of the bucket may be calculated according to the features of the marker M in the image captured by the camera C by using the method shown in FIG. 2, the parameters including a translational distance and a rotating angle of the bucket relative to an excavator body. Therefore, a relative position between the bucket and a target material pile is determined according to the calculated position and orientation parameters of the bucket, thereby determining a command for bucket control.

Figure 4:
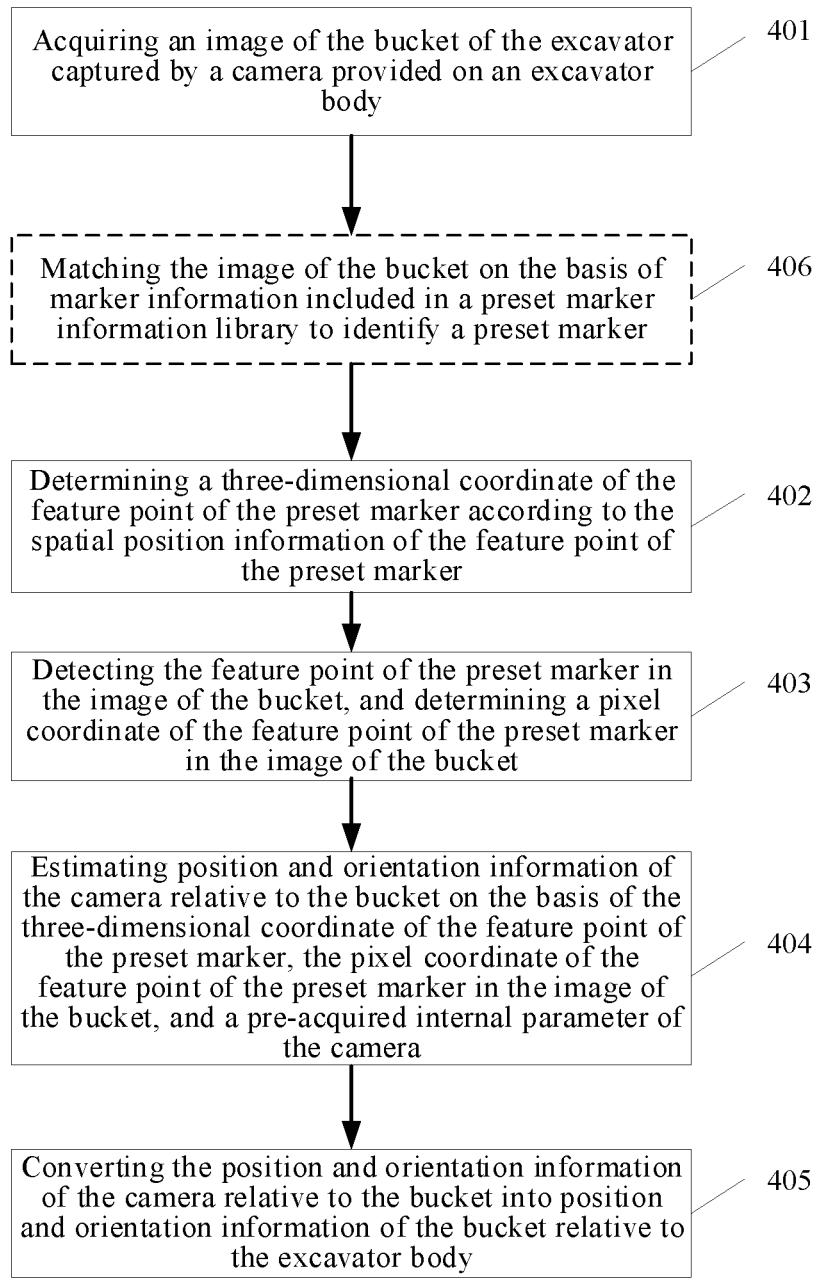
FIG. 4 is a flowchart of the method for determining position and orientation of a bucket of an excavator according to another embodiment of the present disclosure.

Further, referring to FIG. 4, a flowchart 200 of a method for determining position and orientation of a bucket of an excavator according to another embodiment of the present disclosure is shown. As shown in FIG. 4, the flow 400 of the method for determining position and orientation of a bucket of an excavator includes the following steps.

Step 401: acquiring an image of a bucket of the excavator captured by a camera provided on an excavator body.

In the present embodiment, an executing body of the method for determining position and orientation of a bucket of an excavator may be connected to a camera provided on an excavator body so as to acquire an image of the bucket captured by the camera, the image of the bucket including a preset marker provided on the bucket.

Step 402: determining a three-dimensional coordinate of a feature point of the preset marker according to spatial position information of the feature point of the preset marker.

In the present embodiment, the preset marker may include a feature point. The feature point may be a point for identifying a feature of the marker, such as a center point or an angular point of a grid picture. Optionally, the preset marker includes a preset QR code label, and the feature point of the preset marker includes an angular point of the preset QR code label.

The three-dimensional feature information of the preset marker includes spatial position information of the feature point of the preset marker. Here, the spatial position information of the feature point of the preset marker maybe a relative position between feature points, for example, a relative position between four angular points and a center point of the QR code label. A bucket coordinate system may be constructed with one of the feature points as the origin, and a three-dimensional coordinate of each feature point in the bucket coordinate system is determined according to the relative position between the feature points.

Step 403: detecting the feature point of the preset marker in the image of the bucket, and determining a pixel coordinate of the feature point of the preset marker in the image of the bucket.

The image of the bucket acquired in step 401 may be detected, and the feature point of the preset marker in the image of the bucket may be detected according to features such as color and distribution of the feature point.

In the present embodiment, a preset marker information library may store spatial position information of the feature point of the preset marker, and feature information such as the color and distribution of the feature point may be determined according to the spatial position information of the feature point. Alternatively, the feature information such as the color and distribution of the feature points may be directly extracted from the preset marker information library, and then a pixel point corresponding to the feature point is detected in the image of the bucket on the basis of the feature information such as the color and distribution of the feature point, and a coordinate of a corresponding pixel point is acquired as a pixel coordinate of the feature point of the preset marker in the image of the bucket.

Step 404: estimating the position and orientation information of the camera relative to the bucket on the basis of the three-dimensional coordinate of the feature point of the preset marker, the pixel coordinate of the feature point of the preset marker in the image of the bucket, and a pre-acquired internal parameter of the camera.

An internal parameter of the camera may be pre-acquired, the parameter including a focal length, a principal point offset and a distortion coefficient. Then, an internal parameter matrix K of the camera is constructed, and the pixel coordinate Px of the feature point is converted to a camera coordinate system to obtain a coordinates Pc of the feature point in the camera coordinate system.

Assuming that a rotation matrix of the camera relative to the bucket is R and a translation matrix thereof is T, and the coordinate Pc of the feature point in the camera coordinate system and a three-dimensional coordinate Ps of the feature point in a bucket coordinate system have a relationship of $Pc=Ps \times R+T$, the rotation matrix R and the translation matrix T may be estimated according to the coordinates Pc of a plurality of feature points in the camera coordinate system and the three-dimensional coordinates Ps of such feature points in the bucket coordinate system, that is, a rotation parameter and a translation parameter of the camera relative to the bucket are determined.

Step 405: converting the position and orientation information of the camera relative to the bucket into position and orientation information of the bucket relative to the excavator body.

The translation and a rotating angle of the camera relative to the bucket may be converted to a translation parameter and a rotation parameter of the bucket relative to the camera as position and orientation information of the bucket relative to the excavator body. At the time of conversion, a translation parameter and a rotating angle parameter of the bucket relative to the camera may be directly obtained by taking opposite numbers of the translation parameter and the rotation parameter of the camera relative to the bucket.

The method for determining position and orientation of a bucket of an excavator according to the present embodiment pre-acquires spatial position information of a feature point of a marker to determine a three-dimensional coordinate of the feature point of the marker; detects a pixel coordinate of a corresponding feature point in an image of a bucket, so as to determine a relative position and orientation of a camera according to the three-dimensional coordinate and the pixel coordinate of the feature point, thereby further increasing the accuracy of a corresponding relationship between the determined three-dimensional coordinate and the pixel coordinate of the feature point and further improving the accuracy of estimating position and orientation.

In some optional implementations of the present embodiment, the flow 400 of the method for determining position and orientation of a bucket of an excavator may further include the following step.

Step 406: matching the image of the bucket on the basis of marker information included in a preset marker information library to identify the preset marker.

The preset marker information library may include marker information of a plurality of markers. The marker information may include information such as the shape, size and color of the marker, and may also include an image feature of the marker.

The feature information of the preset marker may be extracted from the image of the bucket, and matched with the marker information of each marker in the preset marker information library. A successfully matched marker is used as an identified preset marker.

Further optionally, step 406 may be executed according to the following methods: first, acquiring angle sensing data sensed by angle sensors that are provided on an excavating arm of the excavator and the bucket; second, determining a target position range of the preset marker in the image of the bucket on the basis of the angle sensing data; and finally, detecting marker information within the target position range, and matching in the preset marker information library to identify the preset marker.

When determining the target position range of the preset marker in the image of the bucket on the basis of the angle sensing data, an initial estimation range of the rotating angle of the bucket relative to the excavator body maybe specifically determined according to the angle sensor, and an initial estimation range of a translation amount of the bucket relative to the excavator body may be calculated according to a length of the excavating arm of the excavator and the angle sensing data. A three-dimensional coordinate of each feature point (for example, each angular point) of the preset marker in a bucket coordinate system is converted into an image coordinate system on the basis of the initial estimation range of the rotating angle and the initial estimation range of the translation amount of the bucket relative to the excavator body, as well as an internal parameter of the camera, thereby obtaining a target position range of the preset marker in the image of the bucket. Information of the identified marker may be detected within the target position range, and the detected information of the marker is matched with the preset marker information library so as to obtain an identification result of the preset marker in the image of the bucket.

The target position range of the preset marker in the image is determined by using the angle sensing data obtained by the angle sensor, and then the preset marker is detected within the target position range, which may increase the speed in identifying the preset marker in the image so as to increase the speed in estimating the position and orientation of the bucket. Moreover, the position and orientation of the bucket may be determined by combining the angle sensors on the excavating arm and bucket of the excavator and the image of the bucket captured by the camera, and the position and orientation of the bucket may be determined by relying on the camera in case of failure of the angle sensors, thus ensuring normal operation of the excavator.

Figure 5:
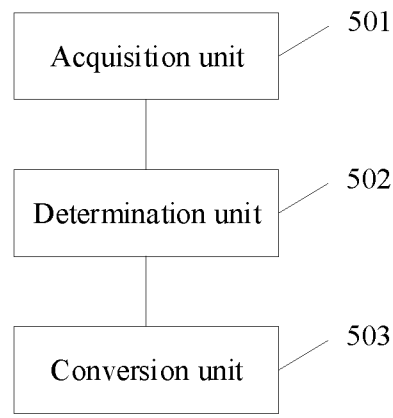
FIG. 5 is a schematic diagram of an apparatus for determining position and orientation of a bucket of an excavator according to an embodiment of the present disclosure.

Further referring to FIG. 5, as an implementation of the method shown in each figure, an embodiment of the present disclosure provides an apparatus for determining position and orientation of a bucket of an excavator. The apparatus embodiment corresponds to the method embodiment shown in FIG. 2, and the apparatus may be specifically applied to various electronic devices.

As shown in FIG. 5, the apparatus 500 for determining position and orientation of a bucket of an excavator includes an acquisition unit 501, a determination unit 502 and a conversion unit 503. The acquisition unit 501 is configured to acquire an image of the bucket of the excavator captured by a camera provided on an excavator body, the image of the bucket including a preset marker provided on the bucket; the determination unit 502 is configured to determine position and orientation information of the camera relative to the bucket on the basis of the image of the bucket and pre-acquired three-dimensional feature information of the preset marker; and the conversion unit 503 is configured to convert the position and orientation information of the camera relative to the bucket into position and orientation information of the bucket relative to the excavator body.

In some embodiments, the three-dimensional feature information of the preset marker includes spatial position information of a feature point of the preset marker; and the determination unit 502 is further configured to determine position and orientation information of the camera relative to the bucket on the basis of the image of the bucket and pre-acquired three-dimensional feature information of the preset marker by the following approach: determining a three-dimensional coordinate of the feature point of the preset marker according to the spatial position information of the feature point of the preset marker; detecting the feature point of the preset marker in the image of the bucket, and determining a pixel coordinate of the feature point of the preset marker in the image of the bucket; and estimating position and orientation information of the camera relative to the bucket on the basis of the three-dimensional coordinate of the feature point of the preset marker, the pixel coordinate of the feature point of the preset marker in the image of the bucket, and a pre-acquired internal parameter of the camera.

In some embodiments, the determination unit 502 is also configured to match the image of the bucket on the basis of marker information included in a preset marker information library to identify the preset marker.

In some embodiments, the determination unit 502 is further configured to identify the preset marker by the following approach: acquiring angle sensing data sensed by angle sensors that are provided on an excavating arm of the excavator and the bucket; determining a target position range of the preset marker in the image of the bucket on the basis of the angle sensing data; and detecting marker information within the target position range, and matching in the preset marker information library to identify the preset marker.

In some embodiments, the preset marker includes a preset QR code label, and the feature point of the preset marker includes an angular point of the preset QR code label.

It should be understood that the units in the apparatus 500 correspond to the steps in the method shown in FIG. 2 and FIG. 4 respectively. Hence, the operation and features of the method are also applicable to the apparatus 500 and units included therein, which are not repeatedly described herein.

The apparatus 500 for determining position and orientation of a bucket of an excavator according to the embodiments of the present disclosure acquires an image of the bucket of the excavator captured by a camera provided on an excavator body, the image of the bucket including a preset marker provided on the bucket; determines position and orientation information of the camera relative to the bucket on the basis of the image of the bucket and pre-acquired three-dimensional feature information of the preset marker; and converts the position and orientation information of the camera relative to the bucket into position and orientation information of the bucket relative to the excavator body, thereby achieves precise calculation of the position and orientation of the bucket on the basis of the image of the preset marker provided on the bucket.

Figure 6:
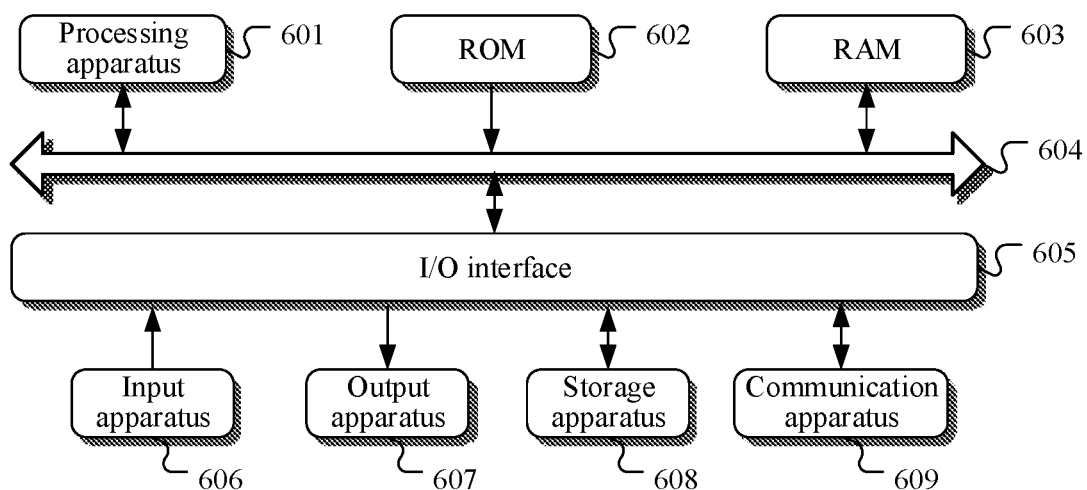
FIG. 6 is a schematic diagram of a computer system adapted to implement embodiments of the present disclosure.

Referring to FIG. 6, a schematic structural diagram of an electronic device (such as the server in FIG. 1) 600 adapted to implement the embodiments of the present disclosure is shown. The server shown in FIG. 6 is merely an example, and should not limit the function and scope of use of the embodiments of the present disclosure.

As shown in FIG. 6, an electronic device 600 may include a processing apparatus (such as a central processing unit, an graphic processor) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following devices may be connected to the I/O interface 605: an input apparatus 606 including, for example, a touch screen, a touch pad, a keyboard, a mouse, a camera, a microphone, an accelerometer and a gyroscope; an output apparatus 607 including, for example, a liquid crystal display (LCD), a speaker and a vibrator; a storage apparatus 608 including, for example, a magnetic tape, a hard disk; and a communication apparatus 609. The communication apparatus 609 may allow the electronic device 600 to exchange data with other apparatus by wireless or wireless communication. Although FIG. 6 illustrates an electronic device 600 having various apparatus, it should be understood that it is not required to implement or have all of the illustrated apparatuses. Alternatively, more or less apparatuses may be implemented. Each of the blocks shown in FIG. 6 may represent one apparatus or may represent multiple apparatuses as desired.

In particular, according to embodiments of the present disclosure, the process described above with reference to the flowchart may be implemented in a computer software program. For example, an embodiment of the present disclosure includes a computer program product, which includes a computer program that is tangibly embedded in a machine readable medium. The computer program includes program codes for executing the method as illustrated in the flowchart. In such an embodiment, the computer program may be downloaded and installed from a network via the communication apparatus 609, and/or may be installed from the storage apparatus 608, or may be installed from the ROM 602. The computer program, when executed by the processing apparatus 601, implements the functions as defined by the method of the embodiment of the present disclosure. It should be noted that the computer readable medium in the embodiments of present disclosure may be computer readable signal medium or computer readable storage medium or any combination of the two. An example of the computer readable storage medium may include, but is not limited to: electric, magnetic, optical, electromagnetic, infrared, or semiconductor systems, apparatus, elements, or a combination of any of the above. A more specific example of the computer readable storage medium may include but is not limited to: electrical connection with one or more wires, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the. In the embodiments of the present disclosure, the computer readable storage medium may be any tangible medium containing or storing programs which may be used by a command execution system, apparatus or element or incorporated thereto. In the embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the. The computer readable signal medium may be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium including but not limited to: wire, optical cable and RF (radio frequency) medium, or any suitable combination of the.

The computer readable medium may be included in the electronic device, or a stand-alone computer readable medium not assembled into the electronic device. The computer readable medium stores one or more programs. The one or more programs, when executed by the electronic device, cause the electronic device to: acquire an image of a bucket of an excavator captured by a camera provided on an excavator body, the image of the bucket including a preset marker provided on the bucket; determine position and orientation information of the camera relative to the bucket on the basis of the image of the bucket and pre-acquired three-dimensional feature information of the preset marker; and convert the position and orientation information of the camera relative to the bucket into position and orientation information of the bucket relative to the excavator body.

A computer program code for executing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code maybe completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flowcharts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor including an acquisition unit, a determination unit and a conversion unit. In some case, names of these units do not constitute the definition of the units themselves, and the acquisition unit may also be described as "a unit for acquiring an image of a bucket of an excavator captured by a camera provided on an excavator body."

The description only provides an explanation of the preferred embodiments of the present disclosure and the technical principles used. It should be appreciated by those skilled in the art that the inventive scope of the present disclosure is not limited to the technical solutions formed by the particular combinations of the-described technical features. The inventive scope should also cover other technical solutions formed by any combinations of the-described technical features or equivalent features thereof without departing from the concept of the disclosure. Technical schemes formed by the-described features being interchanged with, but not limited to, technical features with similar functions disclosed in the present disclosure are examples.

What is claimed is:

1. A method for determining position and orientation of a bucket of an excavator, comprising:
   acquiring an image of the bucket of the excavator captured by a camera provided on an excavator body, the image of the bucket comprising a preset marker provided on the bucket;
   determining position and orientation information of the camera relative to the bucket on the basis of the image of the bucket and pre-acquired three-dimensional feature information of the preset marker; and
   converting the position and orientation information of the camera relative to the bucket into position and orientation information of the bucket relative to the excavator body.

2. The method according to claim 1, wherein the three-dimensional feature information of the preset marker comprises spatial position information of a feature point of the preset marker; and
   the determining position and orientation information of the camera relative to the bucket on the basis of the image of the bucket and pre-acquired three-dimensional feature information of the preset marker comprises:
   determining a three-dimensional coordinate of the feature point of the preset marker according to the spatial position information of the feature point of the preset marker;
   detecting the feature point of the preset marker in the image of the bucket, and determining a pixel coordinate of the feature point of the preset marker in the image of the bucket; and
   estimating the position and orientation information of the camera relative to the bucket on the basis of the three-dimensional coordinate of the feature point of the preset marker, the pixel coordinate of the feature point of the preset marker in the image of the bucket, and a pre-acquired internal parameter of the camera.

3. The method according to claim 2, wherein the determining position and orientation information of the camera relative to the bucket on the basis of the image of the bucket and pre-acquired three-dimensional feature information of the preset marker further comprises:
   matching the image of the bucket on the basis of marker information included in a preset marker information library to identify the preset marker.

4. The method according to claim 3, wherein the matching the image of the bucket on the basis of marker information included in a preset marker information library to identify the preset marker comprises:
   acquiring angle sensing data sensed by angle sensors provided on an excavating arm of the excavator and the bucket;
   determining a target position range of the preset marker in the image of the bucket on the basis of the angle sensing data; and
   detecting marker information within the target position range, and matching in the preset marker information library to identify the preset marker.

5. The method according to claim 2, wherein the preset marker comprises a preset QR code label, and the feature point of the preset marker comprises an angular point of the preset QR code label.

6. An apparatus for determining position and orientation of a bucket of an excavator, comprising:
   at least one processor; and
   a memory storing instructions, wherein the instructions when executed by the at least one processor, cause the at least one processor to perform operations, the operations comprising:
   acquiring an image of the bucket of the excavator captured by a camera provided on an excavator body, the image of the bucket comprising a preset marker provided on the bucket;
   determining position and orientation information of the camera relative to the bucket on the basis of the image of the bucket and pre-acquired three-dimensional feature information of the preset marker; and converting the position and orientation information of the camera relative to the bucket into position and orientation information of the bucket relative to the excavator body.

7. The apparatus according to claim 6, wherein the three-dimensional feature information of the preset marker comprises spatial position information of a feature point of the preset marker; and the determining position and orientation information of the camera relative to the bucket on the basis of the image of the bucket and pre-acquired three-dimensional feature information of the preset marker comprises:

determining a three-dimensional coordinate of the feature point of the preset marker according to the spatial position information of the feature point of the preset marker;

detecting the feature point of the preset marker in the image of the bucket, and determining a pixel coordinate of the feature point of the preset marker in the image of the bucket; and estimating the position and orientation information of the camera relative to the bucket on the basis of the three-dimensional coordinate of the feature point of the preset marker, the pixel coordinate of the feature point of the preset marker in the image of the bucket, and a pre-acquired internal parameter of the camera.

8. The apparatus according to claim 7, wherein the determining position and orientation information of the camera relative to the bucket on the basis of the image of the bucket and pre-acquired three-dimensional feature information of the preset marker further comprises:

matching the image of the bucket on the basis of marker information included in a preset marker information library to identify the preset marker.

9. The apparatus according to claim 8, wherein the matching the image of the bucket on the basis of marker information included in a preset marker information library to identify the preset marker comprises:

acquiring angle sensing data sensed by angle sensors provided on an excavating arm of the excavator and the bucket;

determining a target position range of the preset marker in the image of the bucket on the basis of the angle sensing data; and detecting marker information within the target position range, and matching in the preset marker information library to identify the preset marker.

10. The apparatus according to claim 7, wherein the preset marker comprises a preset QR code label, and the feature point of the preset marker comprises an angular point of the preset QR code label.

11. A non-transitory computer readable medium, storing a computer program, wherein the program, when executed by a processor, causes the processor to perform operations, the operations comprising:

acquiring an image of a bucket of an excavator captured by a camera provided on an excavator body, the image of the bucket comprising a preset marker provided on the bucket;

determining position and orientation information of the camera relative to the bucket on the basis of the image of the bucket and pre-acquired three-dimensional feature information of the preset marker; and converting the position and orientation information of the camera relative to the bucket into position and orientation information of the bucket relative to the excavator body.

12. The non-transitory computer readable medium according to claim 11, wherein the three-dimensional feature information of the preset marker comprises spatial position information of a feature point of the preset marker; and the determining position and orientation information of the camera relative to the bucket on the basis of the image of the bucket and pre-acquired three-dimensional feature information of the preset marker comprises:

determining a three-dimensional coordinate of the feature point of the preset marker according to the spatial position information of the feature point of the preset marker;

detecting the feature point of the preset marker in the image of the bucket, and determining a pixel coordinate of the feature point of the preset marker in the image of the bucket; and estimating the position and orientation information of the camera relative to the bucket on the basis of the three-dimensional coordinate of the feature point of the preset marker, the pixel coordinate of the feature point of the preset marker in the image of the bucket, and a pre-acquired internal parameter of the camera.

13. The non-transitory computer readable medium according to claim 11, wherein the determining position and orientation information of the camera relative to the bucket on the basis of the image of the bucket and pre-acquired three-dimensional feature information of the preset marker further comprises:

matching the image of the bucket on the basis of marker information included in a preset marker information library to identify the preset marker.

14. The non-transitory computer readable medium according to claim 13, wherein the matching the image of the bucket on the basis of marker information included in a preset marker information library to identify the preset marker comprises:

acquiring angle sensing data sensed by angle sensors provided on an excavating arm of the excavator and the bucket;

determining a target position range of the preset marker in the image of the bucket on the basis of the angle sensing data; and detecting marker information within the target position range, and matching in the preset marker information library to identify the preset marker.

15. The non-transitory computer readable medium according to claim 11, wherein the preset marker comprises a preset QR code label, and the feature point of the preset marker comprises an angular point of the preset QR code label.

* * * * *